Jan. 6, 1953  W. BADER  2,624,103
TOOLHOLDER
Filed July 29, 1950
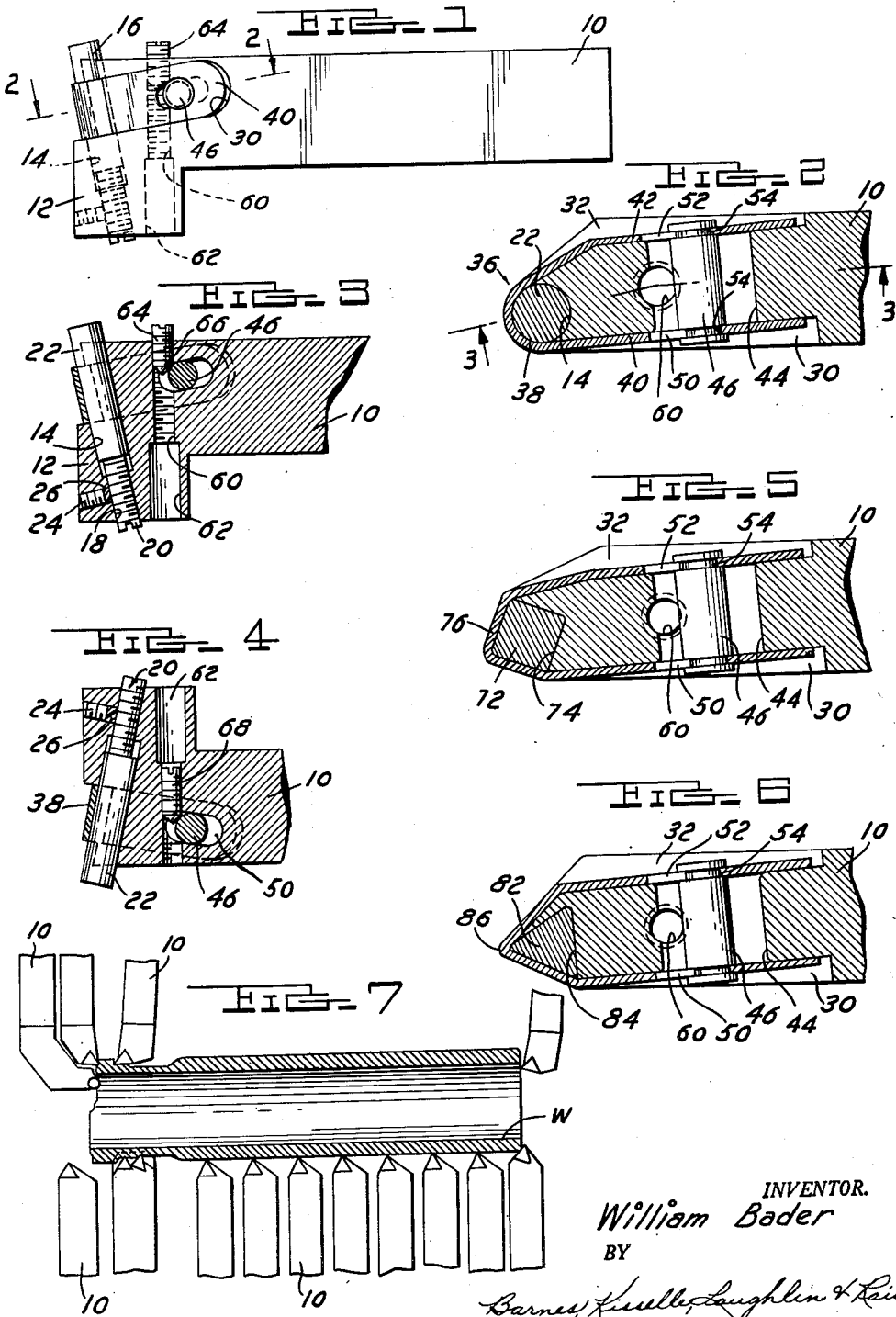
INVENTOR.
William Bader
BY
Barnes, Kisselle, Laughlin & Raisch
ATTORNEYS Patented Jan. 6, 1953

2,624,103

UNITED STATES PATENT OFFICE 2,624,103

TOOLHOLDER

William Bader, Birmingham, Mich., assignor to Wesson Company, Ferndale, Mich., a corporation of Michigan Application July 29, 1950, Serial No. 176,733

3 Claims. (Cl. 29—96)

This invention relates to a tool holder and has particularly to do with that type of holder in which a cutting bit is held in place on a tool body by a band type of holder which surrounds the tool on one side and is tensioned to hold the tool into a recess on the body.

Reference is made to a Patent No. 93,580 to J. R. Bailey, dated August 10, 1869, wherein there is shown a tool of this type.

The present invention is intended to be an improvement over this previous type of tool holder in providing a stronger tool body, a tool adjustment which may be made from the top or bottom of the tool holder, and a tightening arrangement which is entirely confined within the side planes of the tool holder.

With a tool holder as contemplated, it is possible to arrange a plurality of tools side by side on a more or less permanent tool set-up and yet enable an operator to replace a broken or worn out tool bit without disturbing the set-up. Since some of these multiple tool set-ups take many hours to arrange, this is a distinct advantage.

Another feature of the present construction is the tightening arrangement which may be operated either from the bottom or the top of the tool. Thus, on rotating work it is sometimes possible to apply tools to the back as well as the front, and since the back part is rotating in a different direction than the front, the tools would be upside down. The present invention permits control of the tool bit from either side of the tool body.

Various other features of the invention relating to details of construction and operation will be found in the following description and claims.

Drawings accompany the specification, and the various views thereof may be briefly described as:

Figure 1, a side elevation of the assembled tool holder.

Figure 2, a sectional view on line 2—2 of Figure 1.

Figure 3, a sectional view on line 3—3 of Figure 2.

Figure 4, an illustration of the manner in which the tool can be regulated in upside down position.

Figures 5 and 6, sectional views comparable with Figure 2 but illustrating different tool bit forms and band shapes.

Figure 7, a diagrammatic illustration showing a multiple tool set-up.

Referring to the drawings, a tool shank 10 is shown in Figure 1 having a transverse continuation 12 at one end to provide a cutter head together with the end of the shank. A cylindrical recess 14 is provided at the end of the shank 10 and extends downwardly into the cutter head at an angle as shown in Figure 1. Due to this angle, the cylindrical recess terminates at the corner 16 of the cutter head and is only partially defined at this portion of the tool.

Below the recess 14 a tapped hole 18 receives a set screw 20 to adjust the position of a cutter bit 22 relative to the bottom of the recess 14. A second set screw 24 urges a plastic insert 26 against the threads of set screw 20 to prevent vibration of the set screw 20.

The side walls of the shank 10 are cut away at 30 and 32 to provide recesses to receive the ends of a retaining band 36 having a looped portion 38 fashioned to conform to the outer surface of the bit 22. The side or leg members 40 and 42 extend respectively into the recesses 30 and 32 within the confines of the planes defining the side walls of the body 10.

Extending between recesses 30 and 32 is a transverse opening 44 through which passes a pin 46. This pin 46 extends also through oval shaped openings 50 and 52 in the sides of the band 36. Grooves 54 are provided near the ends of the pin 46 to engage the margins of the openings 50 and 52 at the back side. Openings 50 and 52 are formed of two circular configurations overlaid, one having a diameter to receive the pin 46 and the other at the rear of the opening being smaller to correspond to the diameter of the grooved portion 54.

Another passage extends transversely of the tool body and substantially at right angles to the passage 44. This passage consists of a tapped hole 60 terminating in a bore 62 opening to the bottom of the extension 12. This tapped hole 60 is intended to receive a set screw 64 having a conically shaped end 66 which will engage pin 46 to urge the pin back away from the head as the screw 64 is threaded into the hole. A second set screw 68 may be inserted into the tapped hole 60 from the other side of the tool body to perform the same tightening action on pin 46.

The band 36 is preferably formed of spring steel and shaped to the exact shape required in the tensioning movement as shown, for example, in Figure 2. These types of bit inserts will require different recesses and different shaped bands.

In Figure 5 a square bit 72 has a recess 74 and a band 76 suitably shaped to the square bit. The other parts of the assembly are identical with that shown in Figure 2.

In Figure 6 a triangular bit 82 has a triangular recess 84 and a band 86 is suitably shaped to this type of bit. The recesses 30 and 32 on the sides of the tool head are preferably deep enough that all of the working parts of the tool are confined between the planes of the tool body. There may be a tendency for the free ends of the retaining bands to cock outward slightly and these recesses will permit this slight motion without exposing the bands to contact.

In Figure 7 I have shown one type of multiple tool set-up wherein a rotating work piece W is subject to the working of fourteen different tools. Tools on the near side of the work, as shown in Figure 7, are operating as the work rotates downwardly. The tools on the far side of the piece shown in Figure 7 will be upside down relative to the other tools and operating on the work as it moves upwardly (see Figure 4).

One great advantage of the present type of holder is that chip wash-off from the cutting edge will wear against the replaceable band 36 rather than against any portion of the tool body. Since the band is made of tempered steel, it will resist this chip wash to a considerable extent. If, however, wear and abrasion does become excessive, the bands may be readily replaced with new bands which are relatively inexpensive compared with the cost of the entire tool body.

In addition, the band may be about .031 inch thick which, with a placement angle of 7 degrees on the tool insert, allows a very close positioning of the band to the cutting edge without interfering with chip removal. The band is hardened to 40-42 Rockwell C.

The design of the unit permits the tools to be placed very close together and the bits may be tightened or replaced from the top or bottom of the tool, thus permitting the operator to make this adjustment or replacement without changing the position of the tool in the set-up.

Another advantage of the unit is that the inserts which are usually formed of a carbide may be used up to very short lengths due to the method of holding.

In addition, the inserts may be indexed in the recesses so that one insert may make a plurality of cuts prior to being ground. For example, in Figure 2 the round insert could be indexed to several positions before removal. In Figure 5, the bit 72 could be indexed four times and in Figure 6 the bit 82 could be indexed three times. Thus, the expensive carbide inserts can be used to fullest advantage.

What I claim is:

1. In a tool holder of the type comprising a cross-slide shank having a cutter head provided with a bit recess open to the work side of the head and shaped to receive an elongate bit and having an adjustable backing screw at one end of said recess, a band type holder for a carbide insert bit to be received in said recess comprising a U-shaped band of tempered steel of uniform cross-section shaped at the bight to complement the exposed sides of a bit, recesses to receive the legs of said band formed in the sides of the head having base surfaces lying in planes parallel to each other and to the axis of the bit recess, a first passage through said head normal to and between said base surfaces, a free floating cross pin in said passage shorter than the width of said head extending through the legs of said U-shaped band, means in the ends of said pin to engage the edges of holes in said legs, a threaded second passage formed in said head between the bit recess and the first passage, intersecting said first passage and having an axis normal to the first passage, and screw means in at least one end of said second passage positionable on either side of said first passage to apply band tightening pressure on said cross pin in a direction normal to and away from the axis of the bit and bit recess.

2. In a tool holder of the type comprising a cross-slide shank having a cutter head provided with a bit recess open to the work side of the head and shaped to receive an elongate bit and having an adjustable backing screw at one end of said recess, a band type holder for a carbide insert bit to be received in said recess comprising a U-shaped band of tempered steel of uniform cross-section shaped at the bight to complement the exposed sides of a bit, shallow recesses to receive the legs of said band formed in the sides of said head having base surfaces lying in planes parallel to the axis of the bit recess and tangential to walls of the bit recess, a first passage through said head normal to and between said base surfaces, a free floating cross-pin in said passage extending through the legs of said U-shaped band having annular end grooves to engage the edges of holes in said legs, a second passage formed between the bit recess and the first passage, intersecting said first passage and having an axis normal to the first passage, and means axially shiftable in said second passage in either direction to apply band tightening pressure on said cross-pin in a direction normal to and away from the axis of the bit and bit recess.

3. In a tool holder of the type comprising a cross slide shank having a cutter head provided with a bit recess open to the work side of the head and shaped to receive an elongate bit and having an adjustable backing screw at one end of said recess, a band type holder for a carbide insert bit to be received in said recess comprising a U-shaped band of tempered steel of uniform cross section shaped at the bight to complement the exposed sides of a bit and having apertured legs, recesses to receive the legs of said band formed in the sides of the head having base surfaces lying parallel to each other and to the axis of the bit recess, a first passage through said head normal to and between said base surfaces, a free-floating cross pin in said passage shorter than the width of said head extending through the apertures in the legs of said U-shaped band, means at the ends of said pin to engage the said legs, a threaded second passage formed in said head on the bit recess side of the first passage intersecting said first passage and transverse thereto, and screw means in at least one end of said second passage positionable on either side of said first passage to apply band tightening pressure on said cross pin in a direction normal to and away from the axis of the bit and bit recess.

WILLIAM BADER.

REFERENCES CITED

The following references are of record in the file of this patent:

UNITED STATES PATENTS

| Number | Name | Date |
|---|---|---|
| 93,580 | Bailey | Aug. 10, 1869 |
| 647,137 | Hill | Apr. 10, 1900 |
| 1,344,537 | Kalberer | June 22, 1920 |

FOREIGN PATENTS

| Number | Country | Date |
|---|---|---|
| 174,575 | Great Britain | May 11, 1922 |
| 565,126 | France | Nov. 3, 1923 |